(No Model.)

W. T. McRAE.
FRICTION CLUTCH AND COUPLING.

No. 332,931. Patented Dec. 22, 1885.

Witnesses:
John E. Barker
Harry Drury

Inventor:
W. T. McRae
by his Attorneys
Howson and his

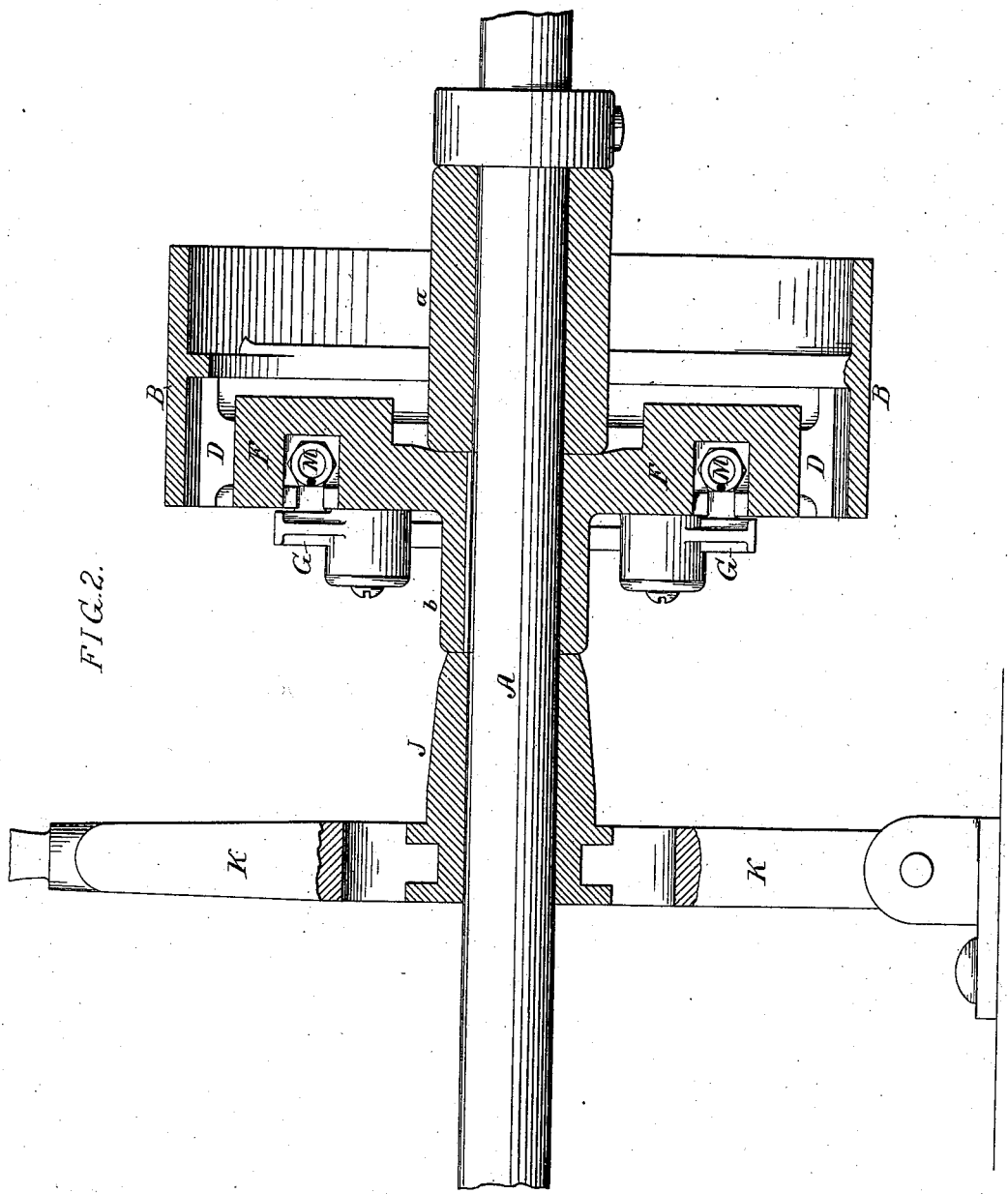

(No Model.) 3 Sheets—Sheet 3.

W. T. McRAE.
FRICTION CLUTCH AND COUPLING.

No. 332,931. Patented Dec. 22, 1885.

Witnesses:
John E. Parver
Harry Drury

Inventor:
W. T. McRae
by his Attorneys
Howson and his

UNITED STATES PATENT OFFICE.

WILLIAM THOMAS McRAE, OF PHILADELPHIA, PENNSYLVANIA.

FRICTION CLUTCH AND COUPLING.

SPECIFICATION forming part of Letters Patent No. 332,931, dated December 22, 1885.

Application filed September 7, 1885. Serial No. 176,365. (No model.)

*To all whom it may concern:*

Be it known that I, WILLIAM THOMAS MCRAE, a citizen of the United States, and a resident of Philadelphia, Pennsylvania, have invented certain Improvements in Friction Clutches and Couplings, of which the following is a specification.

The object of my invention is to construct a compact and powerful friction clutch or coupling for shafting or machinery, and this object I attain in the manner which I will now proceed to describe, reference being had to the accompanying drawings, in which—

Figure 1:
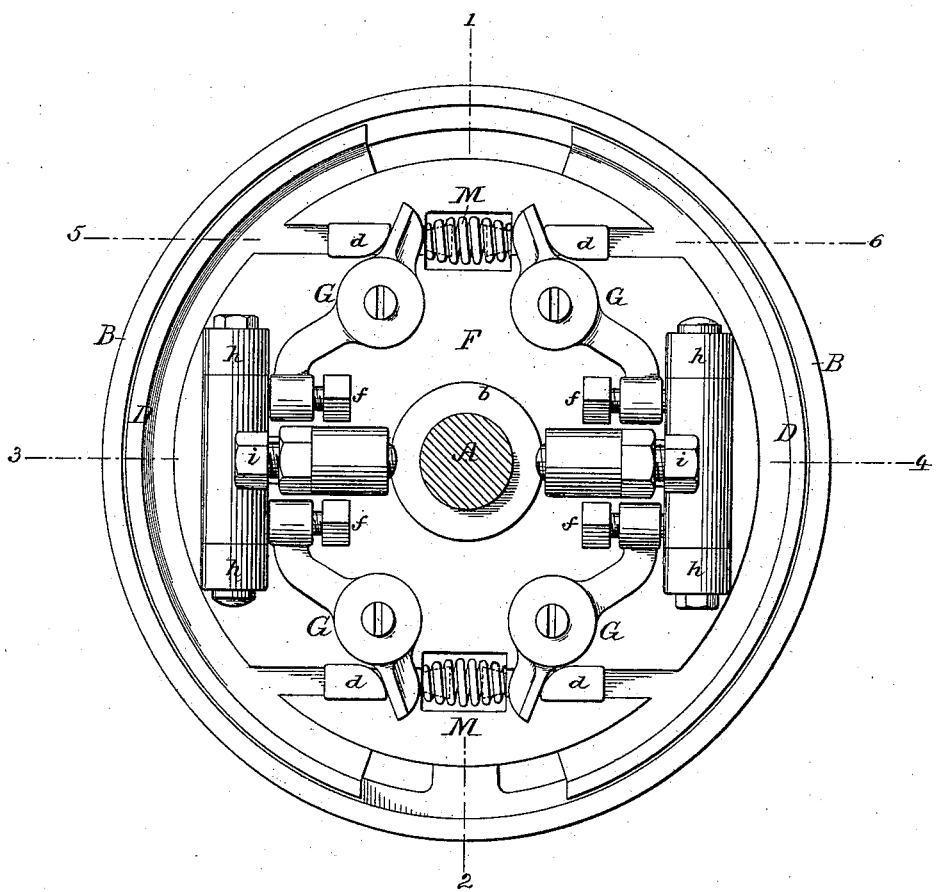
Figure 3:
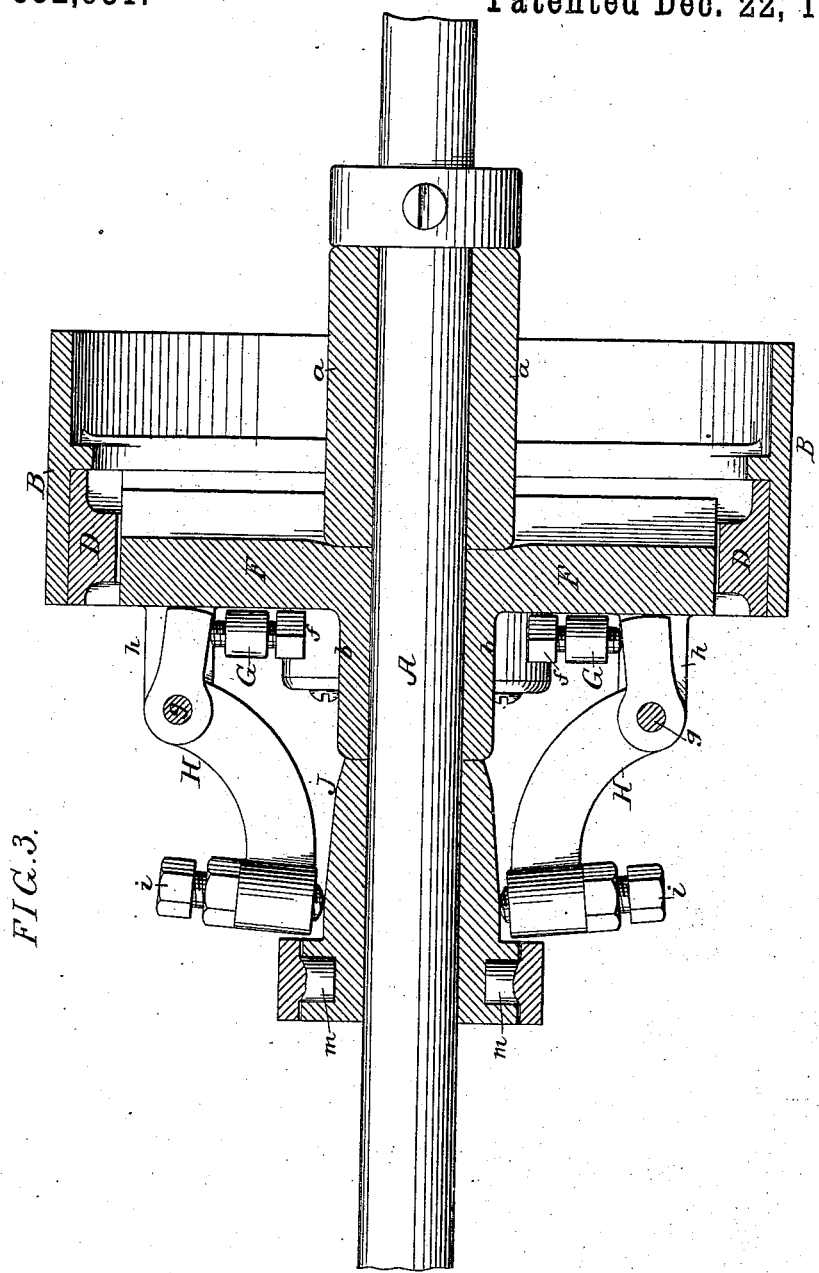

Figure 1 is a face view of my improved friction-clutch applied to a shaft and pulley, the shaft being shown in section; Fig. 2, a longitudinal section on the line 1 2, Fig. 1; Fig. 3, a sectional plan, partly in elevation, on the line 3 4, Fig. 1, and Fig. 4 a sectional plan on the line 5 6, Fig. 1.

Figure 4:
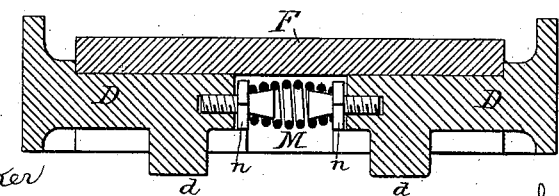

A is a shaft, and B a pulley thereon, and intended to be clutched to or released therefrom, the shaft being driven and power transmitted therefrom by the clutch to the pulley, or the pulley being driven and power transmitted from the same to the shaft by the clutch, as desired. The hub $a$ of the pulley is adapted to turn freely on the shaft, and to the inner face of the rim of the pulley are adapted opposite segmental friction-shoes, D, which are free to slide radially in and are guided by slots in a disk or frame, F, the hub $b$ of which is secured to the shaft A by a slot and key, a setscrew, or other suitable means, so that it is compelled to turn with the shaft. The shoes D have near each end lugs $d$, which project beyond the face of the disk F, as shown in Fig. 4, and are acted upon by the short arms of levers G, hung to studs on the face of the disk, the long arms of said levers carrying set-screws $f$, which are acted upon by the short arms of levers H, hung to pins $g$, carried by studs $h$, on the face of the disk F, the long arms of said levers H being provided with set-screws $i$, upon the inner ends of which acts a cone-sleeve, J, which is free to slide longitudinally on the shaft A, and has a grooved collar for the reception of studs or pins $m$ on the operating-lever K. It will be seen that when the cone-sleeve J is moved toward the disk F the long arms of the levers H will be forced outward, so that their short arms, acting upon the long arms of the levers G, will move the latter inward and their short arms outward against the lugs $d$ of the shoes D, a compound leverage being thus exerted to cause the expansion of the said shoes D against the inner face of the rim of the pulley B, thereby clutching the latter firmly to the disk F and causing a rotation of the pulley with the shaft, or of the shaft with the pulley, if power is applied to the latter. The inner face of each shoe D is furnished with adjustable screw-studs $n$, having undercut heads, as shown in Fig. 4, the screw-studs of one shoe being connected to the corresponding studs of the opposite shoe by means of springs M, as shown in Figs. 1 and 4, so that as soon as the lugs $d$ of the shoes are released from the outward pressure of the levers G, on the retraction of the cone J the shoes will be drawn inward or toward each other and away from frictional contact with the rim of the pulley B, thereby releasing the latter from the control of the shaft, or the shaft from the control of the pulley.

Owing to the duplex-lever arrangement my improved clutch is extremely powerful, and yet is compact and well balanced, so that it is adapted for application to shafts and pulleys intended to run at high speeds without causing undue strain upon any of the parts.

When used as a coupling, the wheel or pulley B should be connected to one shaft and the disk F to the other, as will be readily understood.

I claim as my invention—

1. The combination of a shaft or shafts, a wheel or pulley, and a clutching device comprising a disk or frame, F, secured to the shaft, opposite friction-shoes guided on said frame, levers G, hung to the frame and acting on the shoes, and levers H, also hung to the frame and acting upon the levers G, substantially as specified.

2. The combination of the shaft or shafts and the wheel or pulley with the clutching device comprising a disk or frame, F, secured to the shaft, the friction-shoes D, guided on said frame, the levers G, acting on said shoes, and having set-screws $f$, the levers H, acting on said set-screws, and having set-screws $i$, and a cone-sleeve, J, acting on the latter, as set forth.

3. The combination of the frame or disk F and its opposite guided friction-shoes, levers for actuating the latter, and springs M, connecting the opposite shoes and serving to retract the same, as specified.

4. The combination of the disk or frame F, the friction-shoes D, guided thereon and having adjustable screw-stems $n$, and the springs M, connecting the stems of the opposite shoes, as specified.

In testimony whereof I have signed my name to this specification in the presence of two subscribing witnesses.

WM. THOMAS McRAE.

Witnesses:
JOHN E. PARKER,
HARRY SMITH.